US008887306B1

(12) United States Patent
Palacio (10) Patent No.: US 8,887,306 B1
(45) Date of Patent: Nov. 11, 2014

(54) SYSTEM AND METHOD FOR SENDING SEARCHABLE VIDEO MESSAGES

(71) Applicant: Google Inc., Mountain View, CA (US)

(72) Inventor: José Luis Palacio, Dublin (IE)

(73) Assignee: Google Inc., Mountain View, CA (US)

( * ) Notice: Subject to any disclaimer, the term of this patent is extended or adjusted under 35 U.S.C. 154(b) by 19 days.

(21) Appl. No.: 13/658,764

(22) Filed: Oct. 23, 2012

Related U.S. Application Data

(60) Provisional application No. 61/578,212, filed on Dec. 20, 2011.

(51) Int. Cl.
*H04L 29/06* (2006.01)

(52) U.S. Cl.
USPC ............................. 726/28; 726/26; 713/182

(58) Field of Classification Search
USPC .......................................................... 726/28
See application file for complete search history.

(56) References Cited

U.S. PATENT DOCUMENTS

| 2005/0008130 | A1* | 1/2005 | Wakamatsu | 379/90.01 |
| 2005/0240596 | A1* | 10/2005 | Worthen et al. | 707/10 |
| 2005/0283813 | A1* | 12/2005 | Jamail et al. | 725/109 |
| 2008/0077583 | A1* | 3/2008 | Castro et al. | 707/5 |
| 2008/0097970 | A1* | 4/2008 | Olstad et al. | 707/3 |
| 2009/0019553 | A1* | 1/2009 | Narayanaswami | 726/28 |

* cited by examiner

*Primary Examiner* — Yogesh Paliwal (74) *Attorney, Agent, or Firm* — McDermott Will & Emery LLP (57) ABSTRACT

A system and method is disclosed for sending searchable video messages. A user may create a video message designated for a recipient. On transmission of the video message, a server generates a transcription of the video message and stores the video message in a remote storage location along with the transcription. The video message is then provided to the recipient, and made searchable by providing the transcription as searchable content in connection with the display of the video message.

21 Claims, 7 Drawing Sheets

FIG. 5

SYSTEM AND METHOD FOR SENDING SEARCHABLE VIDEO MESSAGES

CROSS-REFERENCE TO RELATED APPLICATIONS

The present application claims the benefit of priority under 35 U.S.C. §119 from U.S. Provisional Patent Application Ser. No. 61/578,212 entitled "System and Method for Sending Searchable Video Messages," filed on Dec. 20, 2011, the disclosure of which is hereby incorporated by reference in its entirety for all purposes.

TECHNICAL FIELD

The subject technology relates generally to electronic message systems.

BACKGROUND

Over the years, there have been many problems with the adoption of sending video messages instead of email. Video files sent by email may be large, and it is difficult for a sender to know whether a receiving email application or system will allow or reject the file. The uploading and subsequent downloading of video files prior to viewing them may also impose time costs, and may burden email systems that place a cap on email bandwidth or storage. Video messages that include personal content may also be forwarded to recipients not intended by the original sender to view the private nature of the message. Moreover, a user that stores a large amount of email messages may wish to perform a content-based search of those messages to find a message of interest, a task that may not be possible with video messages.

SUMMARY

The subject technology provides a system and computer-implemented method for sending searchable video messages. According to one aspect, a computer-implemented method may include generating a transcription of a video message designated for a recipient, storing in a remote storage location, the video message and the transcription, providing the video message for display to the recipient, and providing the transcription as searchable content to the recipient. The video message may include a media stream. In this regard, the method may also include receiving a search query associated with the video message, searching the searchable content for information related to the search query. On finding information related to the search query, the method may include associating the found information with a corresponding media position in the media stream, and setting the media stream to be streamed from the media position.

In another aspect, a machine-readable media may include instructions that, when executed, perform a method for sending searchable video messages. The method may include receiving a video message associated with a character-based electronic message and one or more users authorized to view the video message, storing the video message in a remote storage location, receiving from a client device, a request for a recipient to view the video message within the character-based electronic message, confirming that the recipient is a member of the one or more users authorized to view the video message, and, on confirming that the recipient is authorized to view the video message, providing for display, the video message to the recipient.

In a further aspect, system according to the subject technology may include a processor and a memory. The memory may include server instructions that, when executed, cause the processor to receive a video message associated with an electronic message, and one or more users authorized to view the video message, generate a transcription of the video message, store the video message and the transcription in a remote location, receive from a client device, a request for a recipient to view the video message within the electronic message, confirm that the recipient is a member of the one or more users authorized to view the video message, and, on confirming that the recipient is authorized to view the video message, provide for display, the video message to the recipient.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1A:
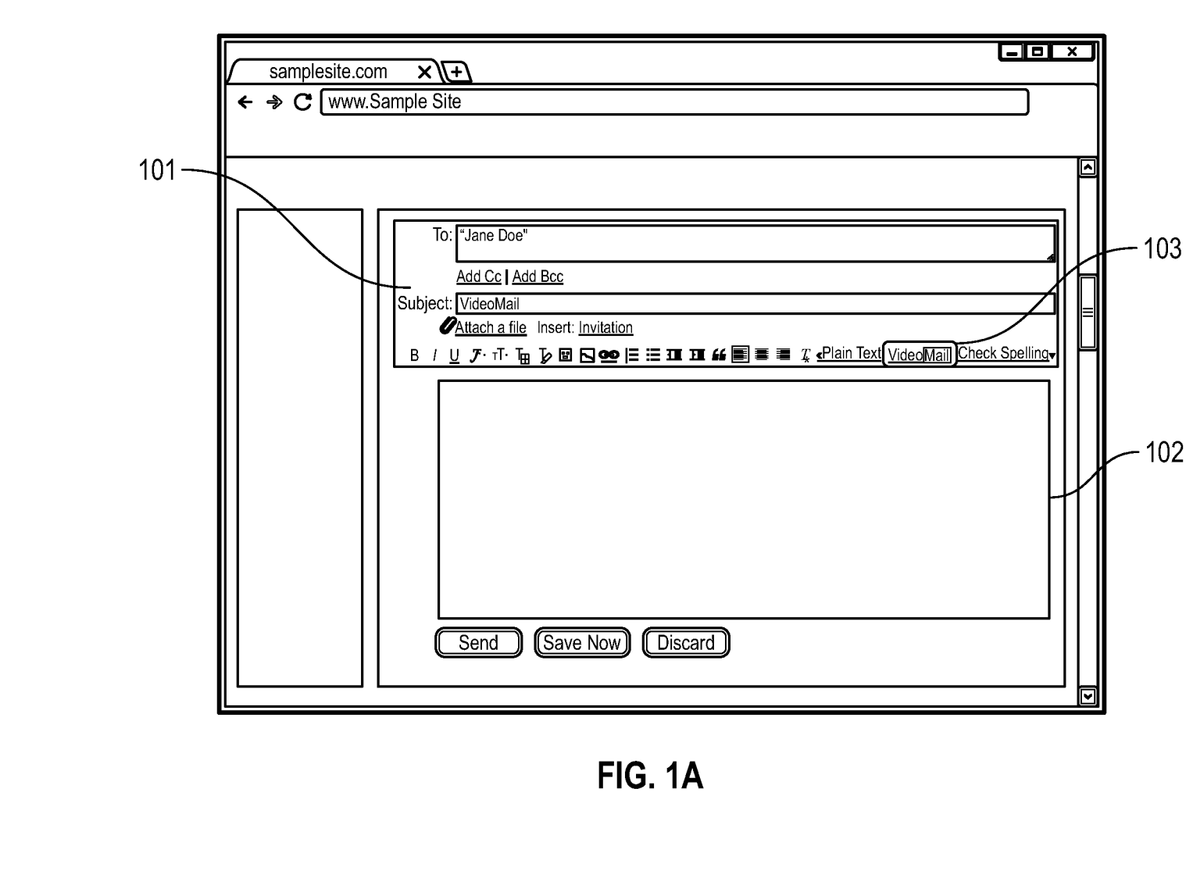
FIGS. 1A to 1C depict an example series of video message screens for sending a searchable video message according to one aspect of the subject technology.
Figure 1B:
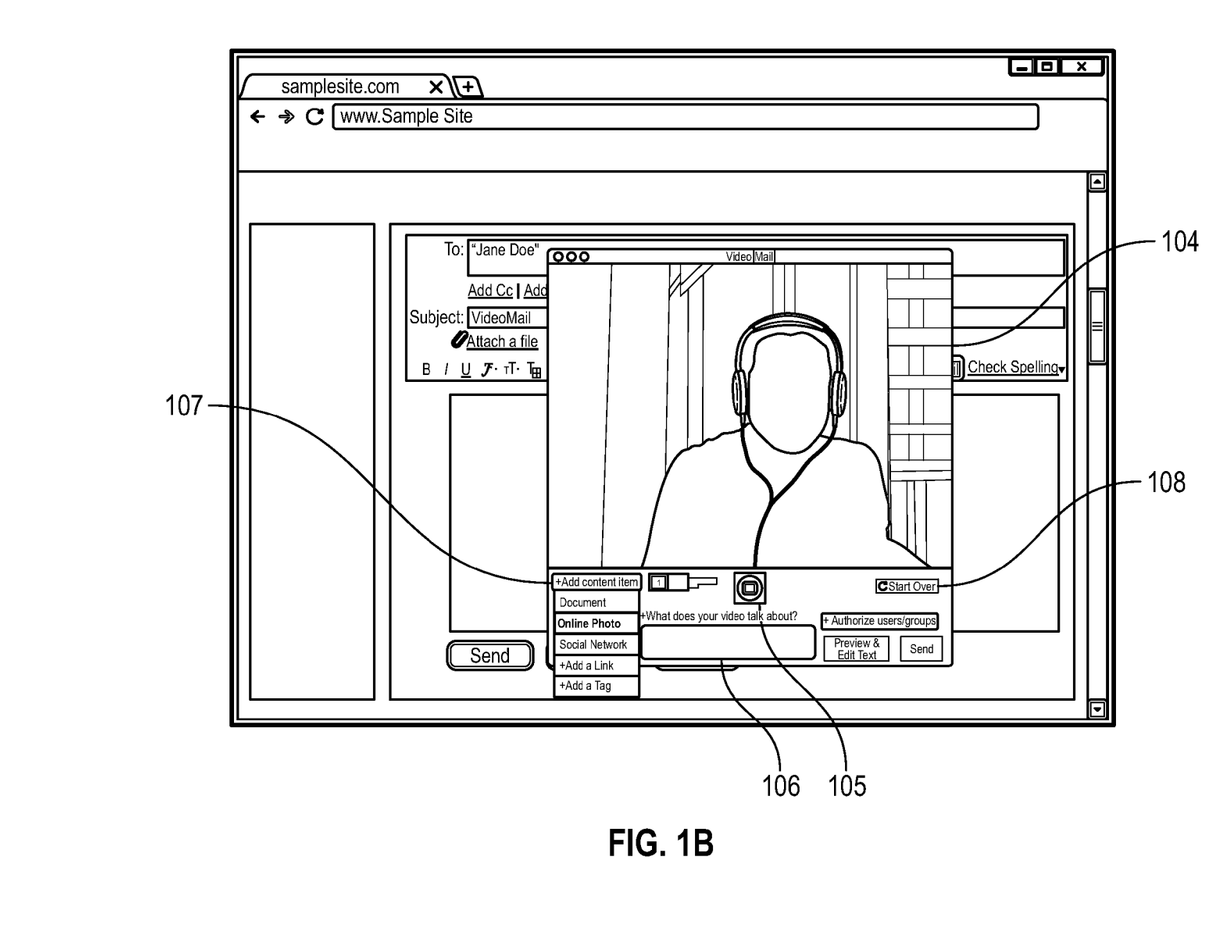
Figure 1C:
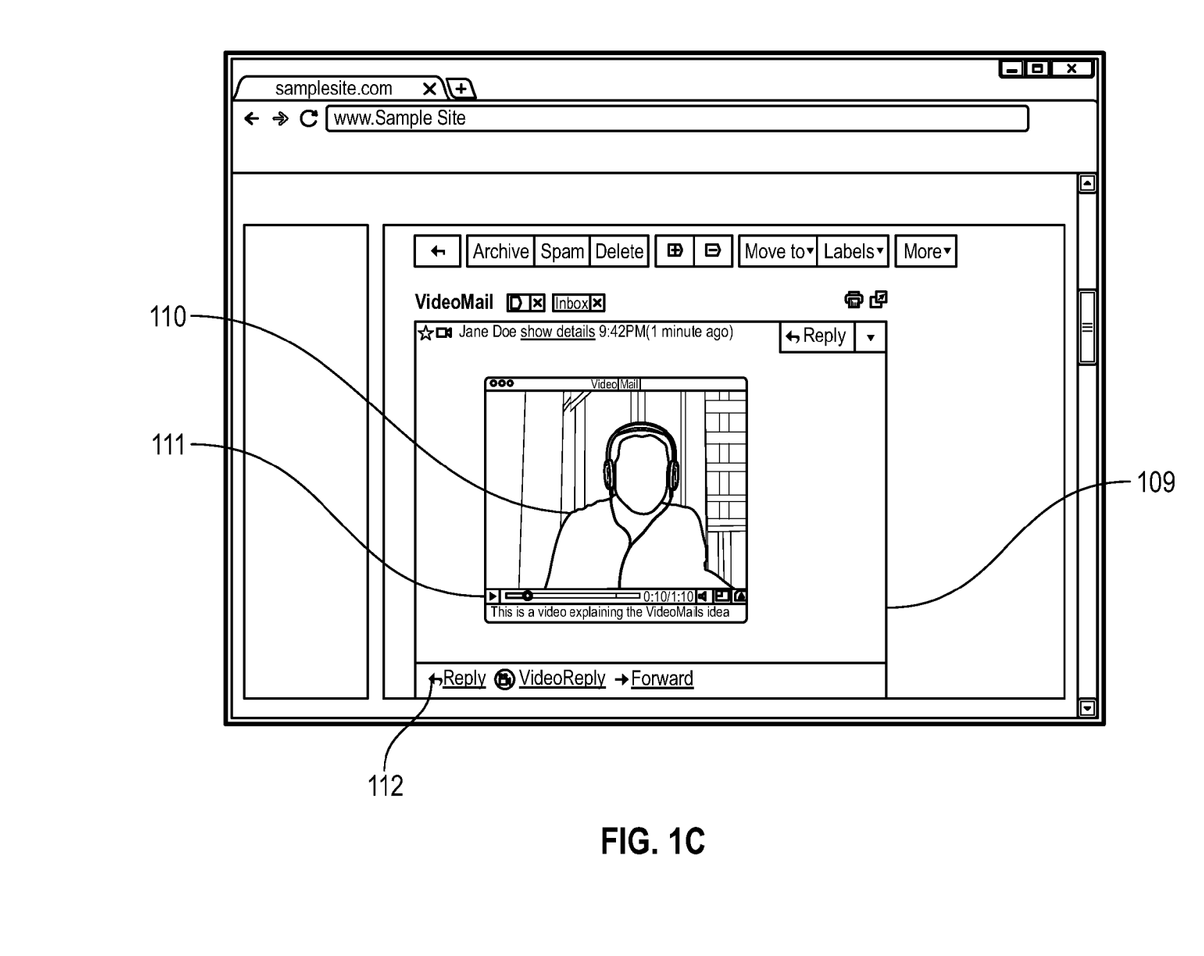

FIGS. 1A to 1C depict an example series of video message screens for sending a searchable video message according to one aspect of the subject technology. As depicted by FIG. 1A, an online, browser-based video mail application 101 (for example, an email client having video capability) may include an composing interface 102 and provide one or more controls for recording and sending a video message. A control 103 may be presented as a hyperlink, graphic button, an option in a drop down menu, and/or the like, and may be activated by a selection using a pointing device (for example, a mouse). As depicted by FIG. 1B, a video capture screen 104 may be provided for the recording and display of a video message. Video capture screen 104 may include, for example, a record button 105 that may be toggled on or off to record or pause recording of the video message. An input area 106 may be provided for the input of a title, brief description, or other character-based information related to the video message. The video message and associated information may be stored in a secure location associated with a user account on a centralized server, and may then be streamed to designated recipients, saving download time and storage space.

In one aspect, the sending user may also select one or more content items, such as files, links, labels, names, tags, and the like, to embed within the video message from a selectable control 107. Once embedded, the previously described content items may not be separable from the video. On selecting to attach a file, a file dialog may be displayed to facilitate the selection of a file (for example, a document, digital photo, or another video) from the sending user's file system (for example, a local file system or a remote system associated with a user account). A selected file may then be embedded within the video message, for example, at a current media position (for example, at a specific time or displayed frame of the video). In another aspect, a sending user may select to embed a tag within the video that corresponds to one or more persons. A selection dialog may be displayed to facilitate selection of a person from a list of contacts, for example, associated with the sending user's account, from an associated social network, or the like. The tag may be attached as a general label to the video, or may appear within the video message when the tagged person appears in the video. On selection of the tag, the system may determine whether the receiving user is authorized to view information about, or communicate with, the tagged person. If authorized, one or more controls may be provided to view the tagged person's information (for example, social network page), or send the person a video message or other electronic message (for example, an email).

In another aspect, the sending user may add a link to the video for selection by the recipient. When selected, the link may navigate a web browser to a web page associated with the link or a file uploaded to a remote storage. Uploaded files associated with a link, for example, may be stored in a secure storage location associated with the user account, on the previously described centralized server. On the selection of a link by a receiving user, the system may determine whether the receiving user is authorized to view the file corresponding to the link, and if authorized, may prompt the receiving user to download or display the file.

One or more privacy controls 108 may also be provided to the sending user for setting a privacy level of the video message, and/or any attached files. In this manner, the sending user may select a privacy level (for example, a numeric value) corresponding to the video message, for a subsequent comparison against an access level assigned to one or more users, or social groups. The sending user may then, for example, assign an access level to each user in a list of user contacts (for example, users of an email account or social network). Users who have an assigned access level of at least the level given to the video message will be authorized to view the video message, while other users will not be so authorized. In another aspect, privacy control 108 may include a drop down list of user contacts and/or groups of user contacts for selection of users authorized to view the video message (for example, in addition to the designated recipients of the video message). Because authorization is enforced at the secure location before the video may be viewed or downloaded, if a designated recipient attempts to forward the video message to an unauthorized recipient, it may not be viewed or downloaded by the unauthorized recipient.

As depicted by FIG. 1C, the previously described recorded video message may be presented to one or more recipients much like a traditional character-based electronic message (for example, an email) is presented. In one aspect, a recipient may receive the video message, including video, audio, and textual information, at an electronic inbox as one integrated message displayed, for example, by a webmail client. In another aspect, the video message may include a window 109 for display of a media stream 110. Media stream 110 may, when activated, begin streaming to the recipient from a remote server. The media stream may be activated automatically on opening the video message, or, in other aspects, may be activated on selection of a playback control 111 (for example, a graphical "play" button). The video message may include one or more controls 112 for replying to the video message (for example, with another video message) or for forwarding the video message to other recipients.

Figure 2:
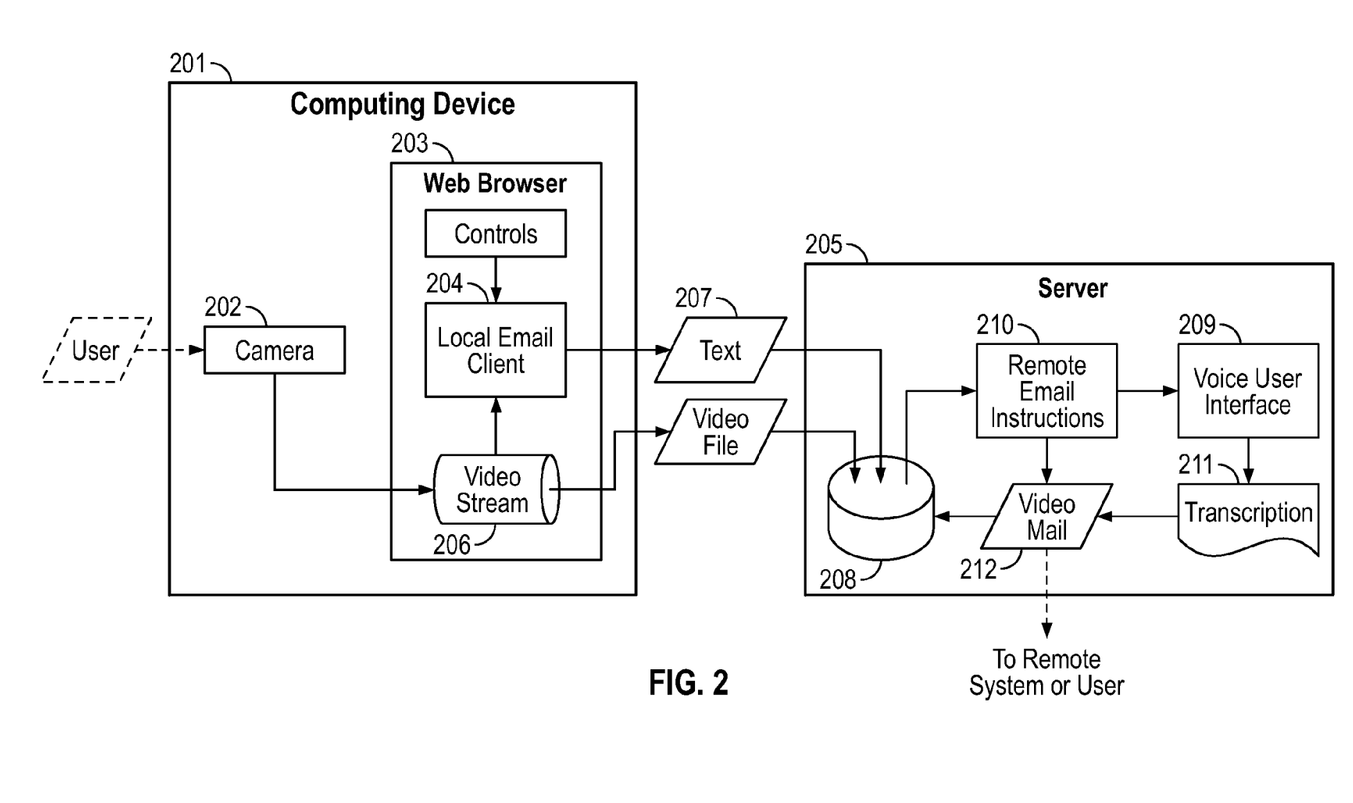
FIG. 2 is a diagram of an example client and server configured for sending searchable video messages according to one aspect of the subject technology.

FIG. 2 is a diagram of an example client and server configured for sending searchable video messages according to one aspect of the subject technology. A computing device 201 (for example, a personal or notebook computer, tablet computer, smart phone, PDA, or the like) may include an integrated camera 202, and be further configured to display a web browser 203. In one aspect, computing device 201 may also be configured with a client application 204 (for example, an email client). Client application 204 may include a webmail client, for example, accessed through web browser 203. In this regard, web browser 202 may operably connect to a server 205 over a network (for example, the Internet, an internet, or other network) for the download and/or display of client application 204. In another aspect, client application 204 may include a desktop application located on computing device 201, and be configured to connect to server 205 to send and record video messages.

Client application 204 may be configured to, on a composition of an electronic message, access camera 202 to receive a video stream 206 from camera 202 (for example, of a person positioned in front of the camera). Client application 204 may be used to compose the previously described video message from video stream 206 and text (and/or character) information 207 received at an input screen displayed by web browser 203. Video stream 206 may then be sent (for example, streamed), along with text information 207, to server 205 for storage in a remote storage 208.

In connection with recording and storing the video message (for example, as a video stream), server 205 may be configured to perform a transcription of the video message. The transcription may be performed automatically or on a selection by a user (for example, at a control located at composing interface 102) to transcribe the video message. Server 205 may, for example, be configured with a voice user interface (VUI) 209 and include remote email instructions 210 (for example, a email server application) that, when executed, cause server to analyze the audio portion of the video using speech-to-text software. Voice user interface 209 may, for example, include a general-purpose microprocessor, microcontroller, or the like, and/or include one or more sequences of instructions or software stored as firmware on one or more memory media, for configuration of hardware to perform the features as described herein. On receipt of video stream 206, remote email instructions 210 may be executed to cause server 205 to store and/or retrieve video stream 205 from remote storage 208, and to send video stream 206 to voice user interface 209. Voice user interface 209 may be configured with speech recognition software, and may be configured to analyze audio content of video stream 206 using speech-to-text processing, and generate a transcription 211 that includes text content from at least a portion of video stream 206 (for example, from audio content). The text content may then be stored at remote storage 208 with video stream 206, returned with video stream 206 to client application 204, or included in a video mail 212 which may be sent by remote email instructions 210 to one or more users or another system remote from server 205.

On display of the video message by a receiving user, transcription 211 may be provided or streamed as a closed caption to provide the receiving user the option of reading the message without the audio enabled. In another aspect, transcription 211 may be stored as video meta data at the secure location and made available as searchable content. Server 205 may parse and index transcription 211 using, for example, general search engine indexing techniques to generate a searchable index. In one aspect, server 205 may associate words, word patterns, and/or groups of words accumulated from transcription 211, and other attached content items such as links, tags, labels, and the like, with respective media positions within video stream 206 (for example, a specific time reference or frame associated with the word in the video stream). In this manner, the indexed information may be provided to an authorized recipient's email system so that the content of video stream 206 may be searchable to discover specific locations within video stream 206 corresponding to a search query. Moreover, the content of video stream 206 may be searchable along with other electronic messages stored by a recipient.

Figure 3:
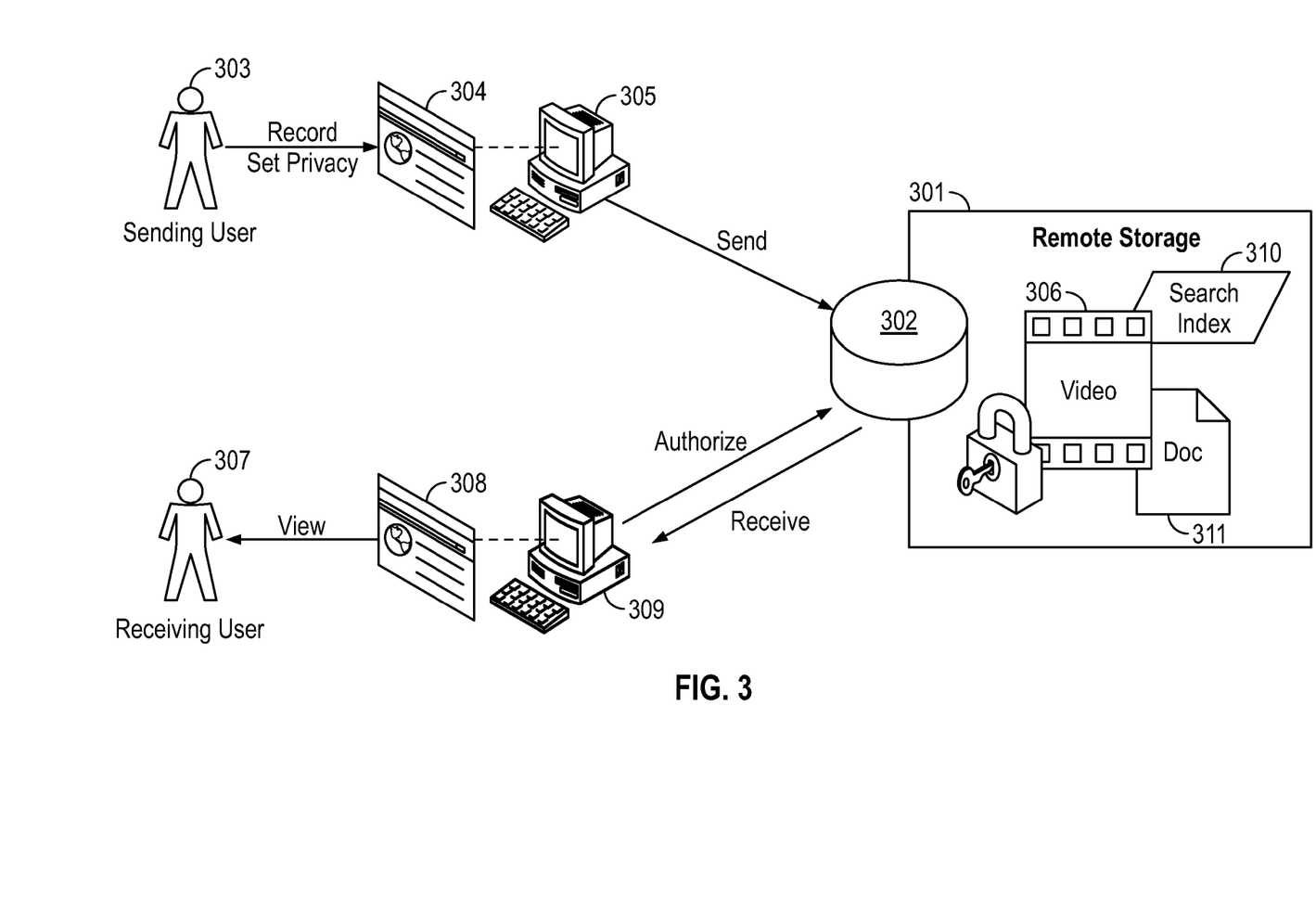
FIG. 3 is a diagram of an example system for providing a searchable video message to an authorized recipient according to one aspect of the subject technology.

FIG. 3 is a diagram of an example system for providing a searchable video message to an authorized recipient according to one aspect of the subject technology. A remote server 301 (for example, server 205) may include one or more storage locations 302 (including, for example, remote storage 208) responsible for storing the previously described video message. Remote server 301 may further be configured to restrict access to unauthorized users, stream video messages, including associated information, to authorized users, and to provide searchable content associated with the video messages.

A first user 303 may access a user interface 304 (for example, a webmail client) located on a first computing device 305 (for example, a first computing device 201) to compose a video message 306 designated for one or more recipients. In one aspect, video message 306 may be stored at remote server 301 and then provided (for example, streamed) to a second recipient 307 via a second user interface 308 located on a second computing device 309 (for example, a second computing device 201). For example, first user 303 may send second user 307 a character-based electronic message (for example, an email) that includes a link to video message 306. In this regard, the character-based electronic message may be sent from one message system to another, while video message 306 remains stored at remote server 301. Video message 306 may then be streamed to second user 307 on receipt of the character-based electronic message by second user 307. In another example, remote server 301 may be integrated with an email client of first user 303, such that video message 306 may be composed to include all information of a typical email, including text, attachments, and other information.

In another aspect, remote server 301 may be configured to receive a search query associated with video message 306, and to determine a media position within a currently provided media stream of video message 306 that corresponds to the search query. For example, the search query may include one or more words related to an audible conversation within video message 306. Remote server 301 may receive the search query, and then perform a search of a transcription (for example, transcription 211) related to video message 306. Searching the transcription may, for example, include searching a search index 310 that was created based on the transcription. On determining the media position, remote server 301 may set the media stream to be streamed from the media position. In this manner, a user (for example, first user 303 or second user 307) may search video message 306 using a standard search query and be taken to a point in the video message corresponding to the search.

First user 303, when composing video message 306, may provide one or more labels or links to embed within video message 306. Remote server 301, on receiving the one or more labels or links, may embed the one or more labels or links within video message 306 at one or more locations within video message 306 selected by first user 303. In one aspect, the embedded one or more labels or links may be provided to search index 310 as searchable content. Similarly, remote server 301 may be configured to embed an electronic file 311 within video message 306. Electronic file 311 may be embedded such that it may be streamed with video message 306 to second user 307, and, in some aspects, may be visible within video message 306 as an embedded link. Second user 306 may then select to download or view electronic file 311 by activation of the corresponding embedded link.

Remote server 301 may receive from first user 303 a list of users authorized to view video message 306. The list of authorized users may include users who use the same email service as first user 303, or users of an associated social network. In one aspect, the list of authorized users may include, or be derived from, a list of email addresses. In another aspect the list of authorized users may include, or be derived from, one or more user-social groups (for example, a group of user contacts organized based on a relationship with first user 303). If video message 306 is forwarded by second user 307 to one or more other users, remote server 301 may control which users may view video message 306, or retrieve associated information, based on the list of authorized users associated with video message 306. In one aspect, on receiving an indication that a third party wishes to view video message 306, remote server 301 may confirm that the third party is one of the authorized users, and then, on confirming that the third party is one of the authorized users, provide for display, video message 306 to the third party. Likewise, on receiving an indication that a third party activated an embedded link, remote server 301 may attempt to confirm that the third party is authorized to view information associated with the embedded link, and, on confirming that the third party is authorized, provide the information to the third party. In one aspect, the information associated with the embedded link may include an electronic file. In another aspect, the information may include personal information (for example, facts) of a user of a social network. In one example, the personal information may be made available for display by the social network.

In another aspect, first user 303 may place an expiration time (for example, a time limit) on the storage of video message 306. Once the expiration time has been exceeded (for example, when the time limit expires), video message 306, including any attached files, may be removed (for example, deleted) from remote server 301 and/or made no longer viewable by any authorized recipients, including second user 307. Removal of video message 306 may include a deletion of the video message from storage location 302, or, in other aspects, removing from one or more of the list of authorized users an authorization to view video message 306.

The various connections between computing devices 304 and 308, server 301, and data storage location 302 may be made over a wired or wireless connection. In some aspects, the functionality of server 301 and storage location 302 may be implemented on the same physical server or distributed among a plurality of servers. Moreover, storage location 302 may take any form such as relational databases, object-oriented databases, file structures, text-based records, or other forms of data repositories.

Figure 4:
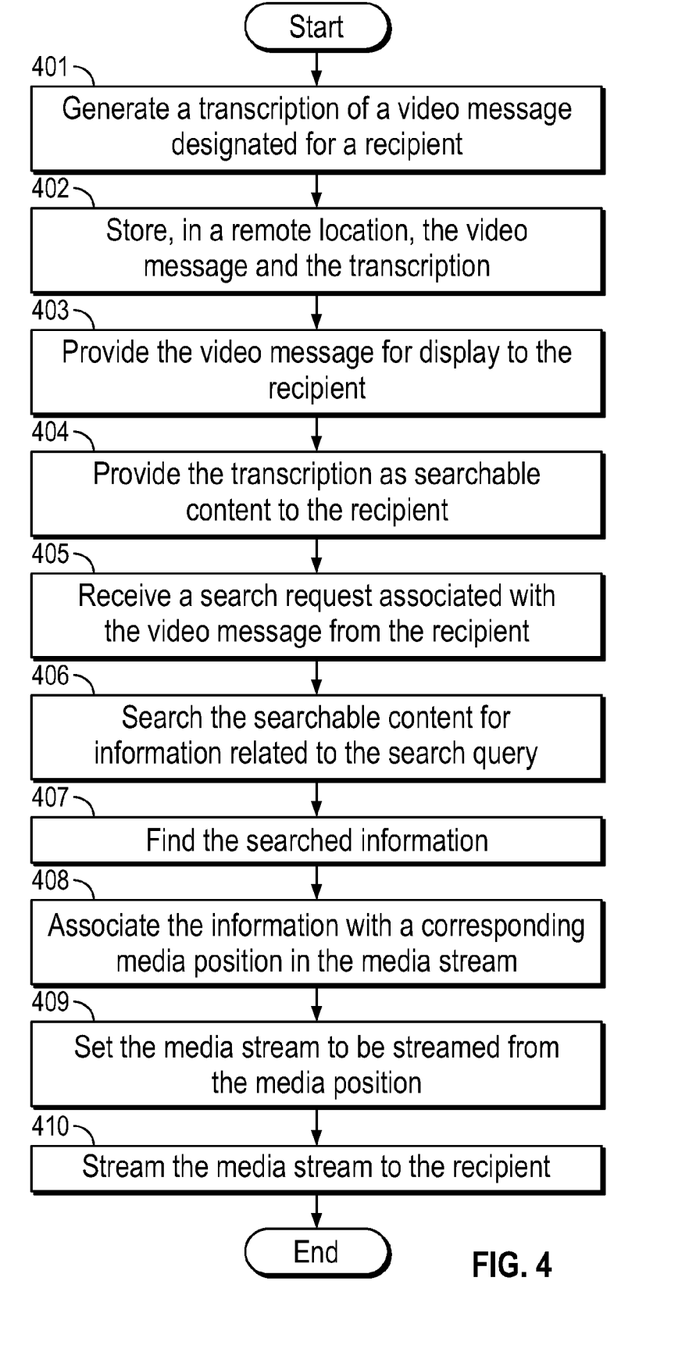
FIG. 4 is a flowchart illustrating an example process for sending searchable video messages according to one aspect of the subject technology.

FIG. 4 is a flowchart illustrating an example process for sending searchable video messages according to one aspect of the subject technology. A remote server (for example, server 301 or the like) may include instructions for sending and receiving electronic messages. At 401, a transcription is generated of a video message designated for a recipient. The transcription may include a character representation of an audio portion of the video message along with one or more content items (for example, labels, links, tags, files, or the like) embedded within the video message. At 402, the video message and the transcription are stored at a remote storage location. At 403, the video message is provided for display to the recipient. In one aspect, providing the video message for display may include streaming the video message to the recipient on receipt of the character-based electronic message (for example, an email) by the recipient.

At 404, the transcription is provided as searchable content to the recipient. In this regard, the searchable content may be stored in the remote storage location and accessed on a search by the recipient. In another aspect, the searchable content may be provided for storage at a storage location associated with the recipient. For example, the searchable content may be provided to an email system for enabling the video message to be searched in connection with a search of the email system. The searchable content may include words, word patterns, and/or groups of words accumulated from the transcription, and other attached content items such as links, tags, labels, and the like. The searchable content may further be associated with respective media positions within the video stream.

At 405, a search query associated with the video message is received from the recipient. On receiving the search query, at 406, the searchable content is searched (for example, by the remote server) for information related to the search query, and, at 407, the information related to the search query found. On finding information related to the search query, at 408, the found information is associated with a corresponding media position in the media stream. At 409, the media stream may be set (for example, by the remote server and/or on a command from the recipient) to be streamed from the media position, and then, at 410, the media stream is streamed to the recipient.

Figure 5:
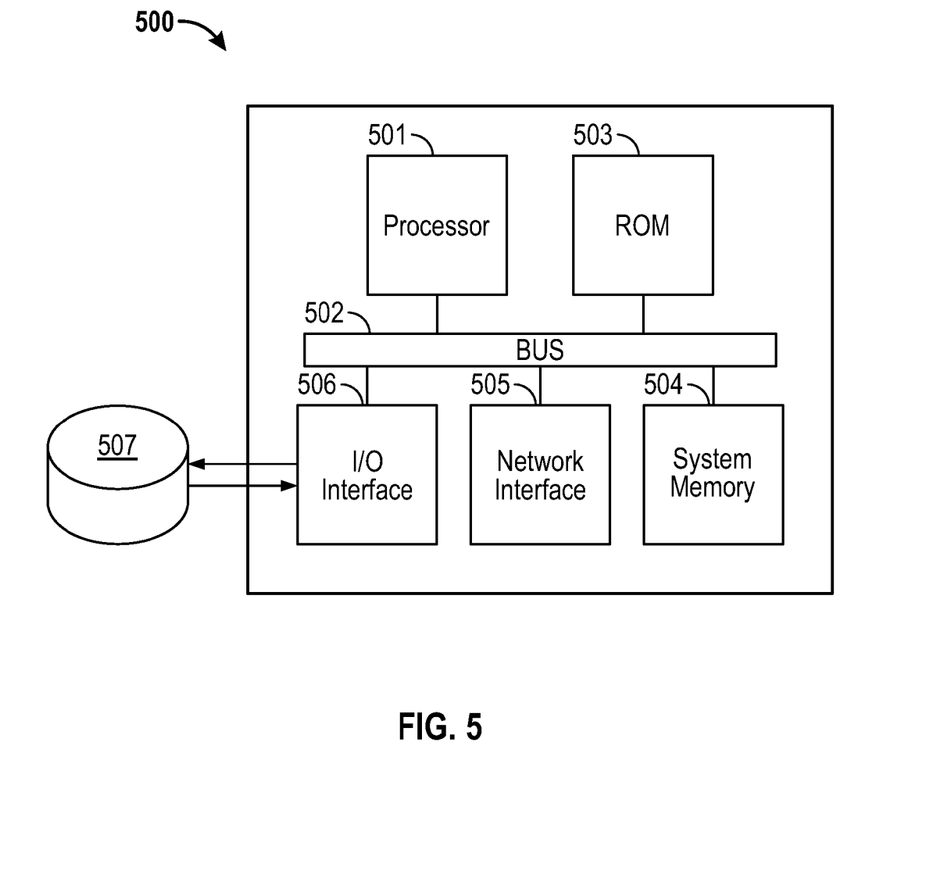
FIG. 5 is a diagram illustrating an example machine or computer for sending searchable video messages, including a processor and other internal components, according to one aspect of the subject technology.

FIG. 5 is a diagram illustrating an example machine or computer for sending searchable video messages, including a processor and other internal components, according to one aspect of the subject technology. In some aspects, a computerized device 500 (for example, computing device 304 or 308, server 301, or the like) includes several internal components such as a processor 501, a system bus 502, read-only memory 503, system memory 504, network interface 505, I/O interface 506, and the like. In one aspect, processor 501 may also be in communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 505, ROM 503, or received from a storage medium 507 (for example, via I/O interface 506). ROM 503, system memory 505, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to send to and receive data from the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term video message may include any aspect of a message containing video content, including video and audio streams, as well as include textual or character-based information Accordingly, the terms video message may be used interchangeably with video stream, and media stream. The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for sending searchable video messages, the method comprising:
    generating a transcription of a video message designated for a recipient, wherein the video message includes a media stream and one or more links embedded in the video message;
    storing in a remote storage location, the video message and the transcription;
    providing the video message for display to the recipient;
    providing the transcription as searchable content to the recipient;
    receiving a search query associated with the video message;
    searching the searchable content for information related to the search query;
    on finding information related to the search query, associating the found information with a corresponding media position in the media stream, the media position corresponding to a specific starting position in the media stream corresponding to the found information;
    receiving an indication that a third party activated an embedded link;
    confirming that the third party is authorized to view information associated with the embedded link and providing the information to the third party; and
    setting the media stream to be streamed from the media position.

2. The computer-implemented method of claim 1, the method further comprising:
    embedding one or more content items within the video message, wherein the searchable content includes a character representation of the one or more content items.

3. The computer-implemented method of claim 2, the method further comprising:
wherein the one or more content items includes an electronic file embedded within the video message, wherein the video message is configured to display the electronic file on an activation of a link provided with the video message.

4. The computer-implemented method of claim 1, the method further comprising:
determining one or more users authorized to view the video message;
receiving a request for a third party to view the video message;
confirming that the third party is one of the authorized users; and
on confirming that the third party is one of the authorized users, providing for display, the video message to the third party.

5. The computer-implemented method of claim 4, wherein determining the one or more users authorized to view the video message includes:
receiving a privacy level associated with the video message; and
determining that each of the one or more users is associated with an access level that corresponds to or exceeds the privacy level.

6. The computer-implemented method of claim 1, wherein the information comprises an electronic file.

7. The computer-implemented method of claim 1, wherein the information comprises personal data related to a user of a social network, the personal data made available for display by the social network.

8. The computer-implemented method of claim 1, the method further comprising:
receiving an expiration time for the video message;
on the expiration time, removing the video message from the remote storage location.

9. The computer-implemented method of claim 1, wherein the video message being designated for the recipient comprises the video message being associated with a character-based electronic message designated for the recipient, and wherein providing the video message for display to the recipient comprises streaming the video message to the recipient on receipt by the recipient of the character-based electronic message.

10. A non-transitory machine-readable media including instructions that, when executed, perform a method for sending searchable video messages, the method comprising:
receiving a video message associated with a character-based electronic message, and one or more users authorized to view the video message, the video message including one or more links embedded within the video message;
storing the video message in a remote storage location;
receiving from a client device, a request for a recipient of the electronic message to view the video message within the character-based electronic message;
confirming that the recipient is a member of the one or more users authorized to view the video message;
on confirming that the recipient is authorized to view the video message, providing for display, the video message to the recipient;
receiving an indication that the recipient activated an embedded link;
confirming that the recipient is authorized to view information associated with the embedded link and providing the information to the recipient; and
on confirming that the recipient is authorized to view the information, providing the information to the recipient.

11. The non-transitory machine-readable media of claim 10, wherein the one or more users authorized to view the video message are received as a group of users authorized to view the video message.

12. The non-transitory machine-readable media of claim 10, the method further comprising:
generating a transcription of the video message;
storing the transcription in the remote storage location along with the video message; and
on confirming that the recipient is authorized to view the video message, providing at least a portion of the transcription as searchable content to the recipient.

13. The non-transitory machine-readable media of claim 12, wherein the video message includes a media stream, the method further comprising:
receiving a search query associated with the video message;
searching the searchable content for information related to the search query;
on finding information related to the search query, associating the found information with a corresponding media position in the media stream; and
setting the media stream to be streamed from the media position.

14. The non-transitory machine-readable media of claim 10, wherein the information comprises an electronic file.

15. The non-transitory machine-readable media of claim 10, wherein the information comprises personal data related to a user of a social network, the personal data made available for display by the social network.

16. The non-transitory machine-readable media of claim 10, the method further comprising:
receiving, for the one or more users, an expiration time related to the video message; and
on the expiration time, removing, from the one or more users, an authorization to view the video message.

17. A system, comprising:
a processor; and
a memory, including server instructions that, when executed, cause the processor to:
receive a video message associated with an electronic message, and one or more users authorized to view the video message, the video message including one or more links embedded within the video message;
generate a transcription of the video message;
store the video message and the transcription in a remote location;
receive from a client device, a request for a recipient of the electronic message to view the video message within the electronic message;
confirm that the recipient is a member of the one or more users authorized to view the video message;
on confirming that the recipient is authorized to view the video message, provide for display, the video message to the recipient;
receiving an indication that the recipient activated an embedded link;
confirming that the recipient is authorized to view information associated with the embedded link and providing the information to the recipient; and
on confirming that the recipient is authorized to view the information, providing the information to the recipient.

18. The system of claim 17, wherein the video message includes a media stream, and wherein the server instructions, when executed, further cause the processor to:

receive a search query related to the video message;

search the transcription for information related to the search query;

on finding information related to the search query, associate the found information with a corresponding media position in the media stream; and set the media stream to be streamed from the media position.

19. A computer-implemented method for sending searchable video messages, the method comprising:

receiving a video message associated with a character-based electronic message designated for one or more recipients, the video message including a media stream and one or more links embedded within the video message;

storing the video message in a remote storage location;

generating searchable content for the video message;

providing for display, the video message to the one or more recipients;

receiving an indication that a recipient activated an embedded link;

confirming that the recipient is authorized to view information associated with the embedded link; and on confirming that the recipient is authorized to view the information, providing the information to the recipient.

20. The computer-implemented method of claim 19, the method further comprising:

receiving a search query associated with the video message;

searching the searchable content for information related to the search query;

on finding information related to the search query, associating the found information with a corresponding media position in the media stream; and setting the media stream to be streamed from the media position.

21. The computer-implemented method of claim 20, wherein the information comprises personal data related to a user of a social network, the personal data being made available for display by the social network.

* * * * *